United States Patent
Lee et al.

(10) Patent No.: US 8,947,394 B2
(45) Date of Patent: *Feb. 3, 2015

(54) ELECTROMAGNETIC RESONANCE SENSING APPARATUS FOR A TOUCH SCREEN

(75) Inventors: Yu-Sheop Lee, Gyeonggi-do (KR); Joo-Hoon Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 316 days.

This patent is subject to a terminal disclaimer.

(21) Appl. No.: 13/478,842

(22) Filed: May 23, 2012

(65) Prior Publication Data

US 2012/0306809 A1 Dec. 6, 2012

(30) Foreign Application Priority Data

Jun. 3, 2011 (KR) .................. 10-2011-0054045

(51) Int. Cl.
*G06F 3/045* (2006.01)
*G06F 3/046* (2006.01)

(52) U.S. Cl.
CPC ..................................... *G06F 3/046* (2013.01)
USPC ..... 345/174; 345/173; 178/18.03; 178/18.06; 178/18.07

(58) Field of Classification Search
USPC ..................... 345/172–179; 178/18.07–19.03
See application file for complete search history.

(56) References Cited

U.S. PATENT DOCUMENTS

| | | | | |
|---|---|---|---|---|
| 4,954,823 A | * | 9/1990 | Binstead | 341/26 |
| 5,028,745 A | * | 7/1991 | Yamanami et al. | 178/18.07 |
| 8,228,312 B2 | * | 7/2012 | Matsubara | 345/174 |
| 2003/0220674 A1 | * | 11/2003 | Anderson et al. | 607/96 |
| 2010/0075720 A1 | * | 3/2010 | Lee et al. | 455/566 |
| 2012/0306810 A1 | * | 12/2012 | Lee et al. | 345/174 |

\* cited by examiner

*Primary Examiner* — Olga Merkoulova
(74) *Attorney, Agent, or Firm* — The Farrell Law Firm, P.C.

(57) ABSTRACT

An electromagnetic sensing apparatus is provided for a touch screen having a display and a soft key. The electromagnetic sensing apparatus includes a Printed Circuit Board (PCB) including a display area corresponding to the display and a sub-area corresponding to the soft key, a controller including channels, which controls electromagnetic sensing of the electromagnetic sensing apparatus, and a plurality of loop units that extend from the channels and output current induced by an electromagnetic field. At least one of the plurality of loop units includes a first sub-loop arranged in the display area and a second sub-loop arranged in the sub-area. At least one of the plurality of loop units includes a first sub-loop arranged in the display area and does not include a second sub-loop.

18 Claims, 6 Drawing Sheets

ELECTROMAGNETIC RESONANCE SENSING APPARATUS FOR A TOUCH SCREEN

PRIORITY

This application claims priority under 35 U.S.C. §119(a) to Korean Patent Application Serial No. 10-2011-0054045, which was filed in the Korean Intellectual Property Office on Jun. 3, 2011, the entire content of which is incorporated herein by reference.

BACKGROUND OF THE INVENTION

1. Field of the Invention

The present invention relates generally to an electromagnetic sensing apparatus in a touch screen display, and more particularly, to an electromagnetic sensing apparatus for sensing an external input from a user by sensing ElectroMagnetic Resonance (EMR).

2. Description of the Related Art

Generally, a user can enter inputs into a device including a touch screen display by touching the screen with a user's body part, e.g., finger, or an EMR pen.

A touch screen display that receives inputs from a user's finger is commonly referred to as a capacitive type touch screen. In general, a capacitive type touch screen includes transparent electrodes and condensers. When the user touches the touch screen, a mechanical displacement occurs in an area of a condenser, such that the touch may be sensed based on the resulting changed capacity of the condenser.

However, the capacitive type touch screen always requires a specific pressure or displacement caused by the user's touch, which may cause user inconvenience.

An EMR type touch screen controls generation of electromagnetic waves by passing current through a loop coil disposed on a Printed Circuit Board (PCB) and controls absorption of the electromagnetic waves into an EMR pen. For example, the EMR pen includes a condenser and a loop, and emits the absorbed electromagnetic waves in a specific frequency. Specifically, the electromagnetic waves emitted from the EMR pen are absorbed again into the loop coil of the PCB such that a position near to the EMR pen can be determined based on the absorbed electromagnetic waves.

Figure 1A:
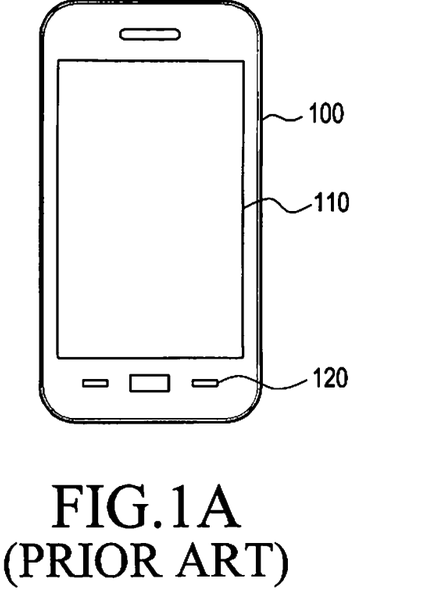
FIG. 1A illustrates a communication device with an electromagnetic sensing circuit operating in a conventional EMR scheme.

FIG. 1A illustrates a communication device with an electromagnetic sensing circuit operating in a conventional EMR scheme.

Referring to FIG. 1A, the communication device 100 includes a display 110 and soft keys 120. The display 110 displays information to a user and may operate in either an EMR scheme or a capacitive scheme.

The soft keys 120 are a user interface provided separately from the display 110, which enable the user to intuitively perform basic functions such as back, cancel, menu display control, etc. Conventionally, the soft keys 120 operate only in the capacitive type scheme due to limitations on accommodation of capacitive sensors and EMR sensors arranged under transparent electrodes. Soft keys having EMR sensors built in them have not been specified yet.

Figure 1B:
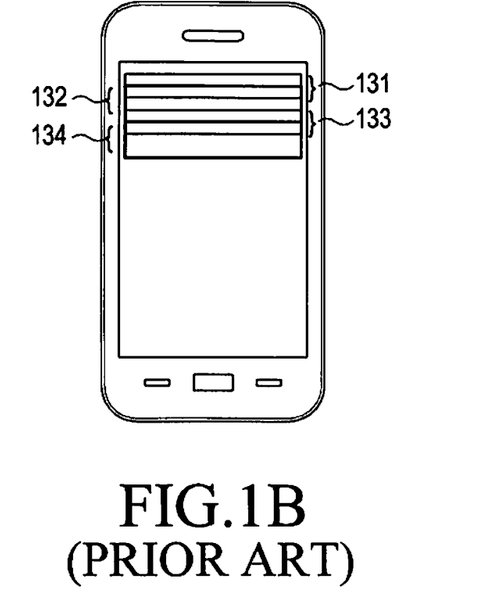
FIG. 1B illustrates a plurality of loops arranged in a display of the communication device illustrated in FIG. 1A.

FIG. 1B illustrates a plurality of loops arranged in a display of the communication device illustrated in FIG. 1A. Specifically, FIG. 1B illustrates a plurality of loops 131 to 134 arranged in the display 110.

Referring to FIG. 1B, the plurality of loops 131 to 134 may be arranged overlapping with each other. When a user places an EMR pen close the display 110, the loops 131 to 134 may sense an electromagnetic field from the EMR pen, thereby identifying a specific position on the display 110.

Figure 1C:
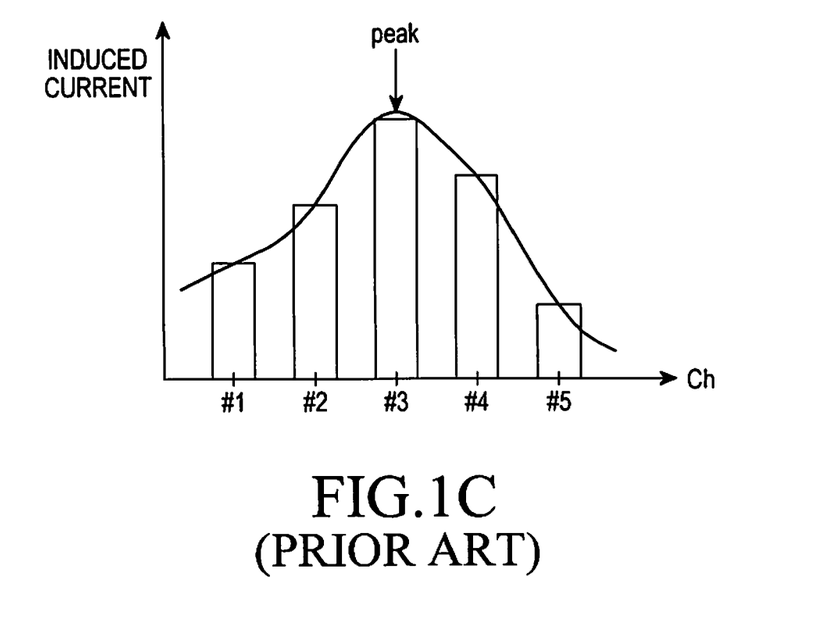
FIG. 1C is a graph illustrating induced current output from the plurality of loops illustrated in FIG. 1B.

FIG. 1C is a graph illustrating induced current output from the plurality of loops illustrated in FIG. 1B.

Referring to FIG. 1C, each of the loops 131 to 134 may output current induced by the sensed electromagnetic field. A loop nearer to the EMR pen may sense a large-amplitude electromagnetic wave and emit induced current corresponding to the sensed electromagnetic wave. Therefore, induced currents with different magnitudes may be output as illustrated in FIG. 1C.

Accordingly, a microprocessor (not shown) of the communication device 100 determines a peak by interpolating the magnitudes of the output induced current and thus, may determine a user-input position on the display.

As described above, because only the capacitive scheme is adopted for the soft keys 120, users should input commands by touching the soft keys 120 with their fingers.

Further, even if channels are added to sense EMR on the soft keys 120, the numbers of channels and coils, as well as a size of the control circuit, increase. However, The larger control circuit and the increased number of coils increase manufacturing costs.

SUMMARY OF THE INVENTION

The present invention is designed to address at least the above-described problems and/or disadvantages and to provide at least the advantages described below.

Accordingly, an aspect of the present invention is to provide an electromagnetic sensing apparatus built in a touch screen, for sharing a single control circuit channel between a display area and a soft key area by integrating a coil arranged in the display area with a coil arranged in the soft key area.

In accordance with an aspect of the present invention, an electromagnetic sensing apparatus of a touch screen having a display and a soft key, wherein the electromagnetic sensing apparatus includes a PCB including a display area corresponding to the display and a sub-area corresponding to the soft key; a controller including a plurality of channels, for controlling electromagnetic sensing of the electromagnetic sensing apparatus; and a plurality of loop units that extend from the plurality of channels for outputting current induced by an electromagnetic field. At least one of the plurality of loop units includes a first sub-loop arranged in the display area and a second sub-loop arranged in the sub-area. At least one of the plurality of loop units includes a first sub-loop arranged in the display area and does not include a second sub-loop.

In accordance with another aspect of the present invention, an electromagnetic sensing apparatus of a touch screen having a display and a soft key, wherein the electromagnetic sensing apparatus includes a Printed Circuit Board (PCB) including a display area corresponding to the display and a sub-area corresponding to the soft key; a controller including a channel, for controlling electromagnetic sensing of the electromagnetic sensing apparatus; and a loop unit that extends from channel and includes a first sub-loop arranged in the display area and a second sub-loop arranged in the sub-area, for outputting current induced by an electromagnetic field. The first and second sub-loops output induced currents having different magnitudes, with respect to the electromagnetic field.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 2A:
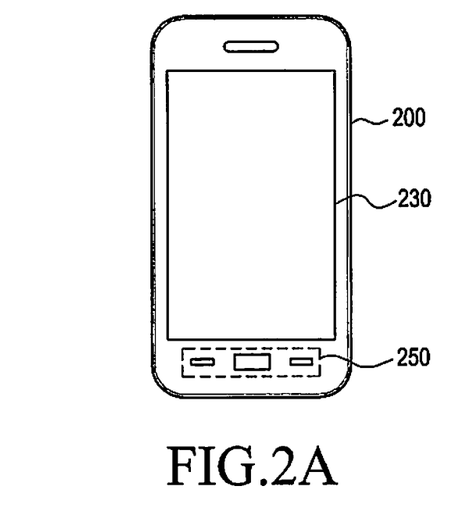
FIG. 2A illustrates a communication device with a touch screen including an electromagnetic sensing apparatus according to an embodiment of the present invention.

FIG. 2A illustrates a communication device with a touch screen including an electromagnetic sensing apparatus according to an embodiment of the present invention.

Referring to FIG. 2A, the communication device 200 includes a display 230 and soft keys 250. The display 230 displays information to a user, and may operate in an EMR scheme or a capacitive scheme. The soft keys 250 are a user interface provided separately from the display 230, which enable the user to intuitively perform basic functions such as back, cancel, menu display control, etc. Unlike the soft keys 120 illustrates in FIG. 1, the soft keys 250 may also operate in the EMR scheme or the capacitive scheme.

Figure 2B:
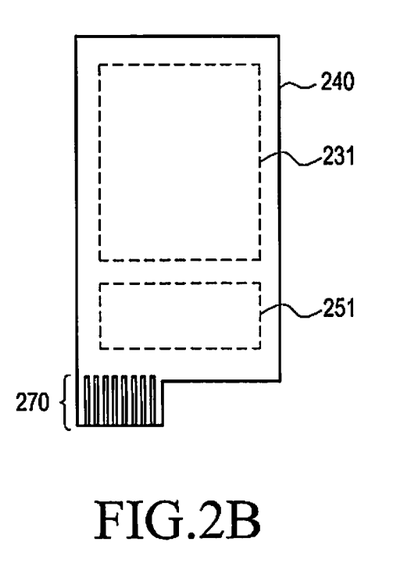
FIG. 2B illustrates an electromagnetic sensing apparatus according to an embodiment of the present invention.

FIG. 2B illustrates an electromagnetic sensing apparatus according to an embodiment of the present invention.

Referring to FIG. 2B, the electromagnetic sensing apparatus includes a PCB 240, which is divided into a display area 231 corresponding to the display 230 and at least one sub-area 251 corresponding to the soft keys 250. The PCB 240 also includes a connector 270.

Although FIG. 2B illustrates that an input/output value of the PCB 240 is received/transmitted from/to an external control device, for example, a motherboard with a microprocessor mounted on it through the connector 270, rather than a controller being disposed on the PCB 240, those skilled in the art will readily understand that a controller (not shown) such as a microprocessor can also be included on the PCB 240.

Additionally, the connector 270 may include a signal transceiver for receiving/transmitting input/output signals of a plurality of channels. For example, the connector 270 may include gold fingers.

Additionally, while the connector 270 illustrated in FIG. 2B has eight channels, this is merely for explanation purposes and the number of channels may set according to design goals.

A first sub-loop may be arranged in the display area 231 to sense an electromagnetic field applied to the display and a second sub-loop may be arranged in the sub-area 251 to sense an electromagnetic field applied to a soft key, in the electromagnetic sensing apparatus. Additionally, the first and second sub-loops may be serially connected into a single sub-loop, sharing one channel, and may be collectively referred to as a loop unit.

Figure 3:
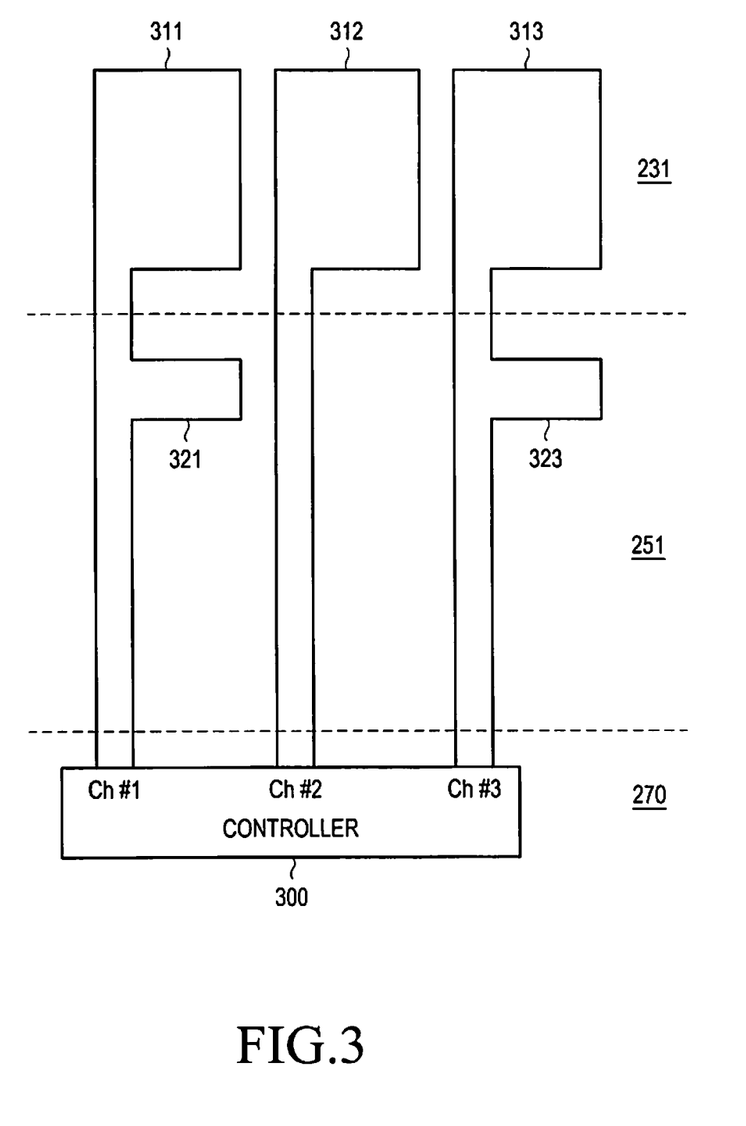
FIG. 3 illustrates a layout of a plurality of loop units on a PCB of an electromagnetic sensing apparatus according to an embodiment of the present invention.

FIG. 3 illustrates a layout of a plurality of loop units on a PCB of an electromagnetic sensing apparatus according to an embodiment of the present invention.

Referring to FIG. 3, the PCB includes a display area 231 corresponding to the display, a sub-area 251 corresponding to the soft keys, and a connector 270.

As described above, a plurality of loop units are arranged on the PCB.

A loop unit connected to a first channel (Ch #1) includes a first sub-loop 311 arranged in the display area 231 and a second sub-loop 321 arranged in the sub-area 251. There is no specific limit on the numbers and areas of coil windings in the first and second sub-loops 311 and 321.

A loop unit connected to a second channel (Ch #2) includes a first sub-loop 312 arranged in the display area 231. Notably, the loop unit connected to Ch #2 does not include a sub-loop arranged in the sub-area 251. The number and area of coil windings of the first sub-loop 312 in the loop unit connected to Ch #2 are preferably equal to those of the first sub-loop 311 in the loop unit connected to Ch #1.

A loop unit connected to a third channel (Ch #3) includes a first sub-loop 313 arranged in the display area 231 and a second sub-loop 323 arranged in the sub-area 251. The numbers and areas of coil windings of the first and second sub-loops 313 and 323 in the loop unit connected to Ch #3 are preferably equal to those of the first and second sub-loops 311 and 321 in the loop unit connected to Ch #1.

While FIG. 3 illustrates the loop units connected to Ch #1, Ch #2, and Ch #3 being spaced from one another, they may also be arranged to overlap one another in real implementation.

As described above, an electromagnetic sensing apparatus according to the embodiment of the present invention is characterized in that at least one of the loop units does not include a second sub-loop in the sub-area 251.

A controller 300, connected via connector 270, determines a position selected with an EMR pen by a user based on a magnitude of an induced current flowing through each loop unit, as output from the channel connected to the loop unit. Specifically, the controller 300 determines a channel connected to a loop unit through which the induced current having the greatest magnitude flows, and thus, determines the loop unit connected to the channel as receiving a user's touch input.

For example, when the electromagnetic sensing apparatus senses the induced current having the largest magnitude from Ch #1, the controller 300 determines that a display region or a soft key corresponding to Ch #1 has been touched.

To determine whether the induced current is from the first sub-loop 311 or the second sub-loop 321 in the loop unit connected to Ch #1, the controller 300 collects the magnitude of induced current from a loop unit adjacent to the user-input loop unit having the largest magnitude of induced current, e.g., the loop unit connected to Ch #2.

When the user selects the first sub-loop 311 in the loop unit connected to Ch #1, a certain magnitude of current is induced to the first sub-loop 312 connected to Ch #2, adjacent to the first sub-loop 311 connected to Ch #1. Accordingly, the induced current with the certain magnitude is output from Ch #2.

When the user selects the second sub-loop 321 in the loop unit connected to Ch #1, no current is induced to the loop unit connected to Ch #2 because there is no adjacent second sub-loop to the second sub-loop 311 connected to Ch #1. Accordingly, induced current with a specific magnitude is not be output from Ch #2.

Therefore, when the magnitude of the induced current output from the adjacent loop is equal to or larger than a predetermined value, the controller 300 may determine that the user has touched the first sub-loop of the user-input loop unit. That is, the controller 300 determines whether the first or second sub-loop of the user-input loop unit has been selected, based on the magnitude of the induced current output from a channel adjacent to the channel that outputs the induced current with the maximum magnitude. Accordingly, the controller 300 may determine whether the user has selected the display region or the soft key corresponding to the loop unit connected to Ch #1.

Alternate inclusion or exclusion of a second sub-loop in a series of loop units as illustrated in FIG. 3 is provided for ease of explanation, and thus more loop units without second sub-loops may be added.

Additionally, the controller 300 may pass current having a predetermined magnitude through the loop units for a first time period and then receive induced current from the loop units, discontinuing current flow for a second time period. Therefore, the electromagnetic sensing apparatus may use the loop units as a current flowing device or an induced current input device in time division.

The electromagnetic sensing apparatus may further include an output loop unit on the PCB, through which current having a predetermined magnitude flows. Thus, the electromagnetic sensing apparatus may use a current flowing device and an induced current input device in space division.

In accordance with another embodiment of the present invention, the controller 300 of the electromagnetic sensing apparatus may determine a position selected with the EMR pen by the user based on a number of channels that output induced current having magnitudes equal to or larger than a predetermined value.

More specifically, when the user selects the second sub-loop 321 in the loop unit connected to Ch #1, the controller 300 determines that an induced current output from Ch #1 has the largest magnitude, indicating that either the first sub-loop 311 or the second sub-loop 321 has been selected in the loop unit connected to Ch #1.

The controller 300 compares the magnitudes of induced current output from all channels with the predetermined value. In this case, where the user has selected the second sub-loop 321 in the loop unit connected to Ch #1, current is not induced to the loop unit connected to Ch #2, which does not include a second sub-loop. Therefore, the magnitude of induced current output from Ch #2 is less than the predetermined value. Accordingly, the controller 300 determines whether the magnitude of the induced current output from each channel is equal to or larger than the predetermined value and thus identifies that a single channel, i.e., Ch #1, outputs an induced current having a magnitude equal to or larger than the predetermined value.

In accordance with an embodiment of the present invention, if two or more channels output induced current having magnitudes equal to or larger than the predetermined value, the controller 300 determines that the user has selected the first sub-loop 311 of the user-input loop unit. Otherwise, the controller 300 determines that the user has selected the second sub-loop 321 of the user-input loop unit.

When the user selects the first sub-loop 311 in the loop unit connected to Ch #1, the controller 300 determines that induced current output from Ch #1 has the largest magnitude. However, as described above, the controller 300 may not immediately determine whether the first sub-loop 311 or the second sub-loop 321 has been selected in the loop unit connected to Ch #1.

Therefore, the controller 300 compares the magnitudes of induced current output from all channels with a predetermined value. In this case, where the user selected the first sub-loop 311 in the loop unit connected to Ch #1, current is induced to the loop unit connected to Ch #2 and thus the magnitude of induced current output from Ch #2 is equal to or larger than the predetermined value. Accordingly, the controller 300 determines whether the magnitude of induced current output from each channel is equal to or larger than the predetermined value and thus determine that two channels, i.e., Ch #1 and Ch #2, output induced current having magnitudes equal to or larger than the predetermined value.

As described above, when two or more channels output induced current having magnitudes equal to or larger than the predetermined value, the controller 300 determines that the user has selected the first sub-loop 311 of the user-input loop unit.

Figure 4:
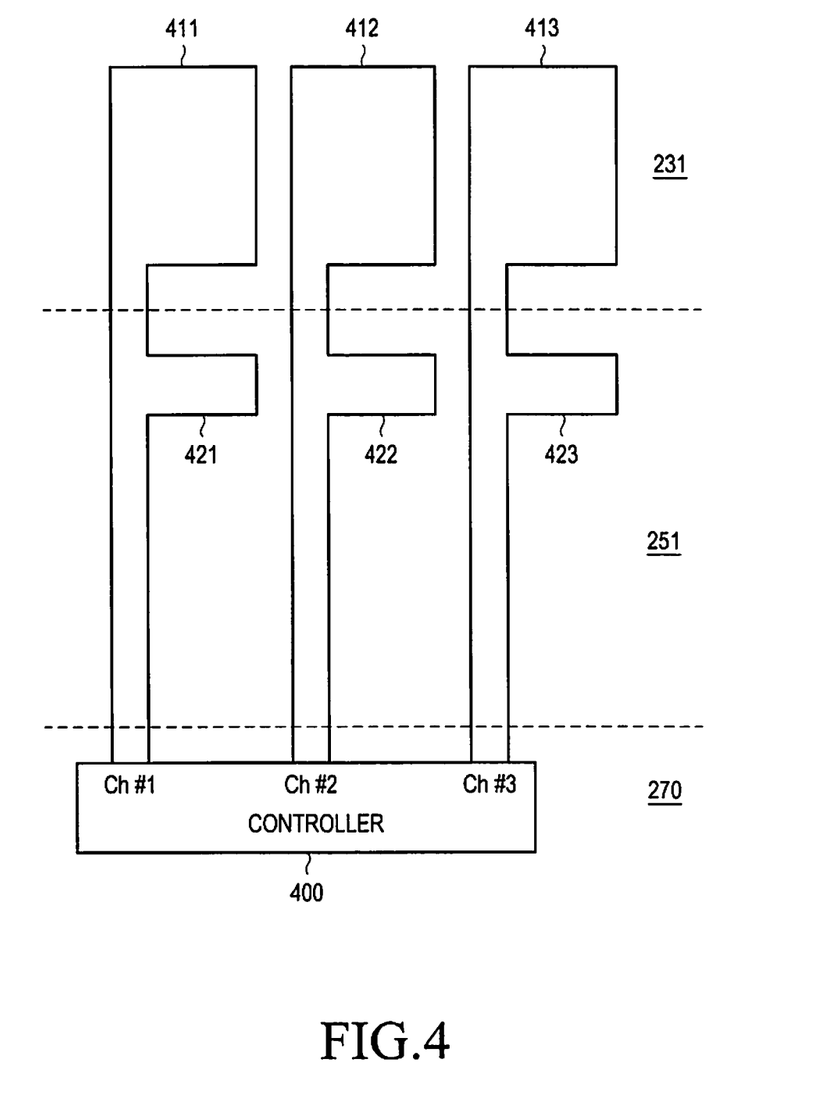
FIG. 4 illustrates a layout of a plurality of loop units on a PCB according to another embodiment of the present invention.

FIG. 4 illustrates a layout of a plurality of loop units on a PCB according to another embodiment of the present invention.

Referring to FIG. 4, the PCB includes the display area 231 corresponding to the display, the sub-area 251 corresponding to the soft keys, and the connector 270.

A plurality of loop units are arranged on the PCB, where a loop unit connected to Ch #1 includes a first sub-loop 411 arranged in the display area 231 and a second sub-loop 421 arranged in the sub-area 251. Again, there is no specific limit on the numbers and areas of coil windings in the first and second sub-loops 411 and 421.

A loop unit connected to Ch #2 includes a first sub-loop 412 arranged in the display area 231 and a second sub-loop 422 arranged in the sub-area 251. Preferably, the numbers and areas of coil windings of the first and second sub-loops 412 and 422 are equal to those of the first and second sub-loops 411 and 421 of the loop unit connected to Ch #1.

A loop unit connected to Ch #3 includes a first sub-loop 413 arranged in the display area 231 and a second sub-loop 423 arranged in the sub-area 251. Preferably, the numbers and areas of coil windings of the first and second sub-loops 413 and 423 are equal to those of the first and second sub-loops 411 and 421 of the loop unit connected to Ch #1.

While FIG. 4 illustrates the loop units connected to Ch #1, Ch #2, and Ch #3 as being spaced from one another, they may actually be arranged to overlap with one another. The distances between the first sub-loops 411, 412 and 413 may be smaller than the distance between the second sub-loops 421, 422 and 423.

When the user selects the second sub-loop 421 of the loop unit connected to Ch #1, a controller 400 determines that an induced current output from Ch #1 has the largest magnitude. However, as described above, the controller 400 may not immediately determine whether the first sub-loop 411 or the second sub-loop 421 has been selected in the loop unit connected to Ch #1.

Because the second sub-loops 421, 422, and 423 are spaced apart from one another by a larger distance than the first sub-loops 411, 412 and 413, even though the user selects the second sub-loop 421 in the loop unit connected to Ch #1, current induced to the second sub-loop 422 in the loop unit connected to Ch #2 may have a magnitude below a predetermined value.

The controller 400 compares the magnitudes of induced current output from all channels with the predetermined value. In this case, where the user has selected the second sub-loop 421 in the loop unit connected to Ch #1, the magnitude of induced current output from Ch #2 is less than the predetermined value. Accordingly, when the controller 400 determines whether the magnitude of induced current output from each channel is equal to or larger than the predetermined value, it determines that a single channel has output induced current having a magnitude equal to or larger than the predetermined value.

In accordance with an embodiment of the present invention, when two or more channels output induced current having magnitudes equal to or larger than the predetermined value, the controller 400 determines that the user has selected the first sub-loop 411 of the user-input loop unit. Otherwise, the controller 400 determines that the user has selected the second sub-loop 421 of the user-input loop unit.

When the user selects the first sub-loop 411 in the loop unit connected to Ch #1, the controller 400 may also determine a user-selected position in a similar manner as described above with reference to FIG. 3. Accordingly, a detailed description will not be provided herein to avoid a redundant description.

Additionally, those skilled in the art will readily understand that a structure for determining a user-selected position can also be realized based on the magnitude of induced current output from a loop unit adjacent to a user-input loop unit in the embodiment of FIG. 4.

Figure 5:
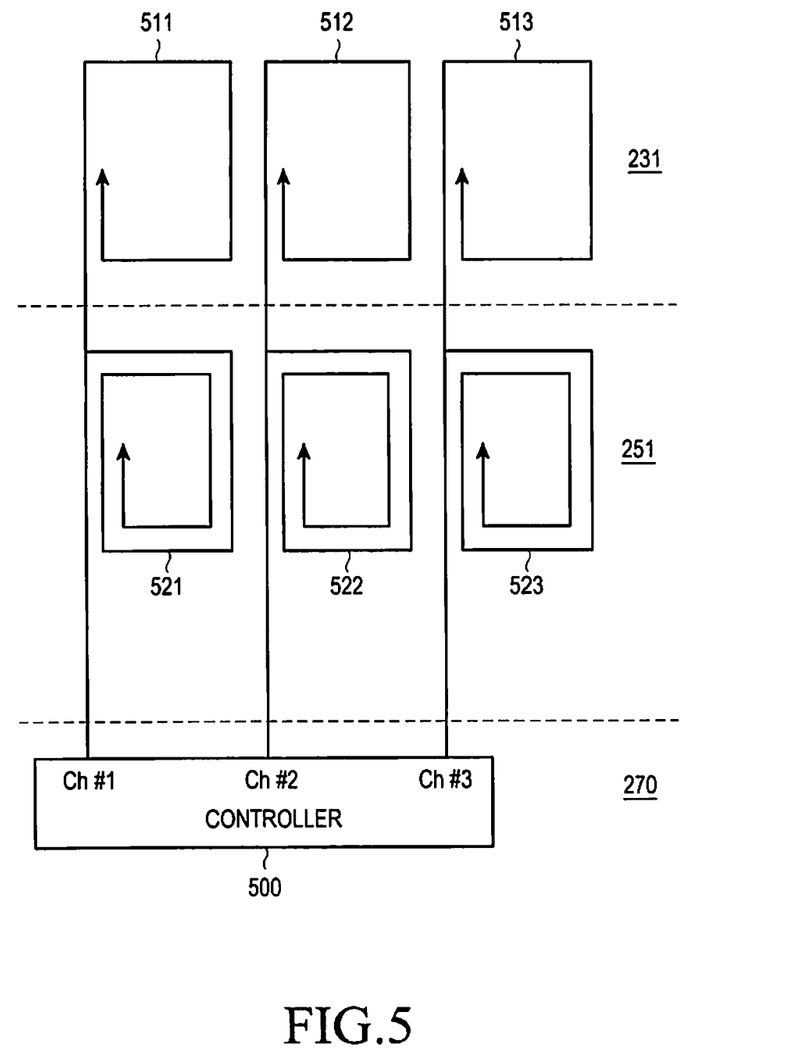
FIG. 5 illustrates a layout of a plurality of loop units on a PCB according to another embodiment of the present invention.

FIG. 5 illustrates a layout of a plurality of loop units on a PCB according to another embodiment of the present invention.

Referring to FIG. 5, the PCB includes the display area 231 corresponding to the display, the sub-area 251 corresponding to the soft keys, and the connector 270.

Again, a plurality of loop units are arranged on the PCB, where a loop unit connected to Ch #1 includes a sub-loop 511 arranged in the display area 231 and a second sub-loop 521 arranged in the sub-area 251. The first and second sub-loops 511 and 521 may occupy the same winding area. However, the number of coil windings of the second sub-loop 521 is preferably twice as large as that of the first sub-loop 511.

A loop unit connected to Ch #2 includes a first sub-loop 512 arranged in the display area 231 and a second sub-loop 522 arranged in the sub-area 251. Preferably, the numbers and areas of coil windings of the first and second sub-loops 512 and 522 are equal to those of the first and second sub-loops 511 and 521, respectively, of the loop unit connected to Ch #1.

A loop unit connected to Ch #3 includes a first sub-loop 513 arranged in the display area 231 and a second sub-loop 523 arranged in the sub-area 251. Preferably, the numbers and areas of coil windings of the first and second sub-loops 513 and 523 are equal to those of the first and second sub-loops 511 and 521, respectively, of the loop unit connected to Ch #1.

While the loop units connected to Ch #1, Ch #2, and Ch #3 are illustrated in FIG. 5 as spaced from one another, they may be arranged to overlap one another in real implementation.

The magnitude of a current induced by an electromagnetic field may be proportional to the number of coil windings. Therefore, under the condition that other variables are controlled, if the number of coil windings of a second sub-loop is the double of the number of coil windings of a first sub-loop, current induced to the second sub-loop has a magnitude twice as large as the first sub-loop, for the same electromagnetic field.

Therefore, a controller 500 may determine whether the user has selected the first or second sub-loop by reading a pre-stored induced current magnitude database. More specifically, the controller 500 determines whether the user has selected the first or second sub-loop, depending on whether the difference between the magnitude of induced current of a channel outputting an induced current having the largest magnitude and the value of the database is below a predetermined value.

Figure 6:
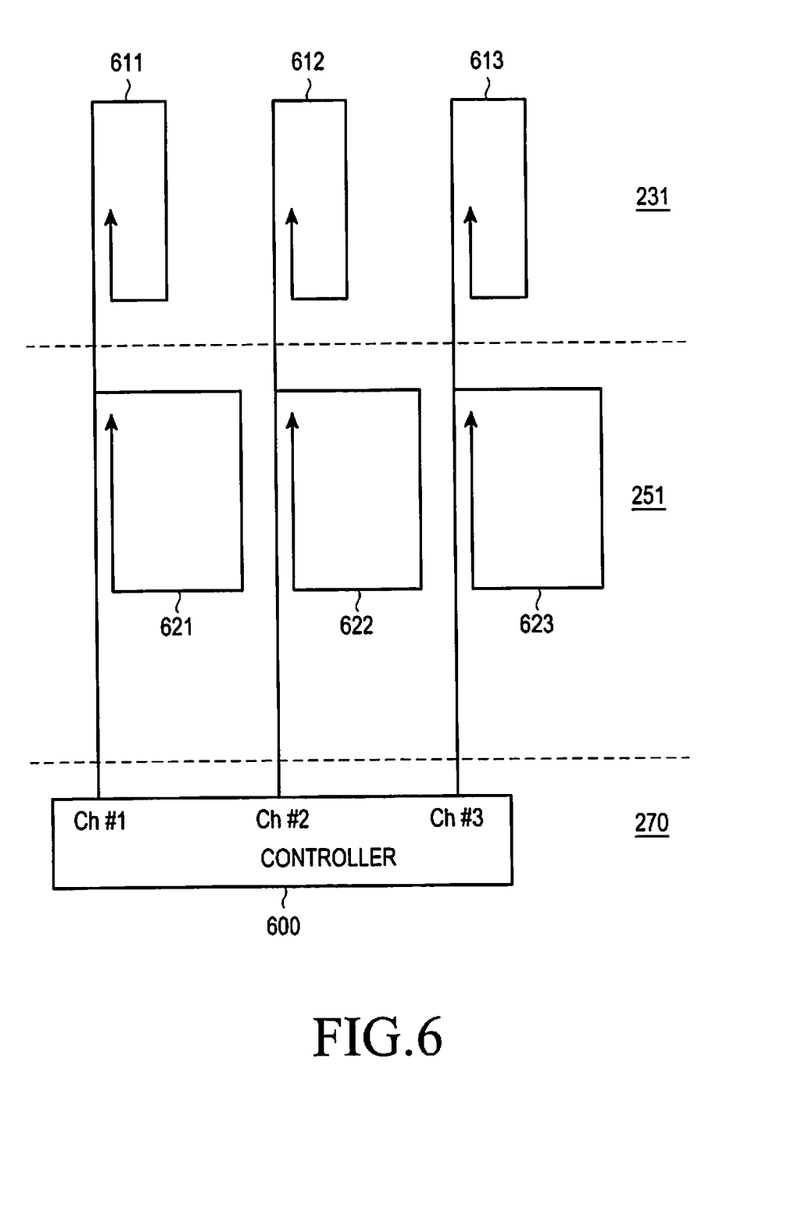
FIG. 6 illustrates a layout of a plurality of loop units on a PCB according to a further embodiment of the present invention.

FIG. 6 illustrates a layout of a plurality of loop units on a PCB according to another embodiment of the present invention.

Referring to FIG. 6, the PCB includes the display area 231 corresponding to the display, the sub-area 251 corresponding to the soft keys, and the connector 270.

Again, a plurality of loop units are arranged on the PCB, where a loop unit connected to Ch #1 includes a sub-loop 611 arranged in the display area 231 and a second sub-loop 621 arranged in the sub-area 251. The first and second sub-loops 611 and 621 may have the same number of coil windings. However, the area of coil windings of the second sub-loop 621 is preferably twice as large as that of the first sub-loop 611.

A loop unit connected to Ch #2 includes a first sub-loop 612 arranged in the display area 231 and a second sub-loop 622 arranged in the sub-area 251. Preferably, the numbers and areas of coil windings of the first and second sub-loops 612 and 622 are equal to those of the first and second sub-loops 611 and 621, respectively, of the loop unit connected to Ch #1.

A loop unit connected to Ch #3 includes a first sub-loop 613 arranged in the display area 231 and a second sub-loop 623 arranged in the sub-area 251. Preferably, the numbers and areas of coil windings of the first and second sub-loops 613 and 623 are equal to those of the first and second sub-loops 611 and 621, respectively, of the loop unit connected to Ch #1.

While the loop units connected to Ch #1, Ch #2, and Ch #3 are illustrated in FIG. 6 as being spaced apart from one another, they may be arranged to overlap one another in real implementation.

The magnitude of current induced by an electromagnetic field is proportional to the area of coil windings. Therefore, under the condition that other variables are controlled, if the area of coil windings of a second sub-loop is double that of the area of coil windings of a first sub-loop, current induced to the second sub-loop will have a magnitude twice as large as current induced to the first sub-loop, for the same electromagnetic field.

Therefore, a controller 600 may determine whether the user has selected the first or second sub-loop by reading a pre-stored current magnitude database. More specifically, the controller 600 determines whether the user has selected the first or second sub-loop, depending on whether a difference between the magnitude of induced current of a channel outputting an induced current having the largest magnitude and the value of the database is below a predetermined value.

As is apparent from the above-described embodiments of the present invention, an electromagnetic sensing apparatus is provided, in which a coil arranged in a display area and a coil arranged in a soft key area are integrated to share a single control circuit channel. This decreases the number of channels required for a control circuit and the size of the control circuit and the number of coils.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. An electromagnetic sensing apparatus of a touch screen including a display and a soft key, the electromagnetic sensing apparatus comprising:
   a Printed Circuit Board (PCB) including a display area corresponding to the display and a sub-area corresponding to the soft key;
   a controller including a plurality of channels, for controlling electromagnetic sensing of the electromagnetic sensing apparatus; and
   a plurality of loop units that extend from the plurality of channels for outputting current induced by an electromagnetic field,
   wherein at least one of the plurality of loop units includes a first sub-loop arranged in the display area and a second sub-loop arranged in the sub-area, and
   wherein at least one of the plurality of loop units includes a first sub-loop arranged in the display area and does not include a second sub-loop.

2. The electromagnetic sensing apparatus of claim 1, wherein the controller compares induced current from each of the plurality of loop units, and determines a loop unit having the induced current with a largest magnitude to be a user-input loop unit.

3. The electromagnetic sensing apparatus of claim 2, wherein if a magnitude of induced current from a loop unit adjacent to the user-input unit is greater than or equal to a predetermined value, the controller determines that a display region corresponding to a first sub-loop of the user-input loop unit has been selected.

4. The electromagnetic sensing apparatus of claim 2, wherein if a magnitude of induced current from a loop unit adjacent to the user-input unit is smaller than a predetermined value, the controller determines that a soft key corresponding to a second sub-loop of the user-input loop unit has been selected.

5. The electromagnetic sensing apparatus of claim 2, wherein if a predetermined number of loop units output induced current with magnitudes greater than or equal to a predetermined value, the controller determines that a display region corresponding to a first sub-loop of the user-input loop unit has been selected.

6. The electromagnetic sensing apparatus of claim 2, wherein if fewer than a predetermined number of loop units output induced current with magnitudes greater than a predetermined value, the controller determines that a soft key corresponding to a second sub-loop of the user-input loop unit has been selected.

7. The electromagnetic sensing apparatus of claim 1, wherein the controller passes current having a predetermined magnitude through the plurality of loop units and receives induced current from the plurality of loop units for a first time period, and discontinues current flow for a second time period.

8. The electromagnetic sensing apparatus of claim 1, further comprising an output loop unit arranged on the PCB, through which current having a predetermined magnitude flows.

9. An electromagnetic sensing apparatus of a touch screen including a display and a soft key, the electromagnetic sensing apparatus comprising:
   a Printed Circuit Board (PCB) including a display area corresponding to the display and a sub-area corresponding to the soft key;
   a controller including a channel, for controlling electromagnetic sensing of the electromagnetic sensing apparatus; and
   a loop unit that extends from channel and includes a first sub-loop arranged in the display area and a second sub-loop arranged in the sub-area, for outputting current induced by an electromagnetic field,
   wherein the first and second sub-loops output induced currents having different magnitudes, with respect to the electromagnetic field.

10. The electromagnetic sensing apparatus of claim 9, wherein the controller determines a magnitude of induced current when a user input is entered view the loop unit, and determines whether the display region corresponding to the first sub-loop or the soft key corresponding to the second sub-loop in the loop unit has been selected according to the magnitude of the induced current.

11. The electromagnetic sensing apparatus of claim 10, further comprising a memory for pre-storing an induced current magnitude database,
   wherein if an absolute value of a difference between the magnitude of the induced current from the loop unit and the induced current magnitude database is smaller than a predetermined value, the controller determines that the display region corresponding to the first sub-loop of the loop unit has been selected.

12. The electromagnetic sensing apparatus of claim 9, wherein the first and second sub-loops have different numbers of coil windings.

13. The electromagnetic sensing apparatus of claim 9, wherein the first and second sub-loops have different areas of coil windings.

14. The electromagnetic sensing apparatus of claim 9, wherein the controller passes current having a predetermined magnitude through the loop unit and receives the induced current from the loop unit for a first time period, and discontinues current flowing for a second time period.

15. The electromagnetic sensing apparatus of claim 9, further comprising an output loop unit arranged on the PCB, through which current having a predetermined magnitude flows.

16. The electromagnetic sensing apparatus of claim 9, further comprising another loop unit that extends from another channel and includes a first sub-loop arranged in the display area and a second sub-loop arranged in the sub-area, for outputting current induced by the electromagnetic field,
   wherein the first and second sub-loops output induced currents having different magnitudes, with respect to the electromagnetic field, and
   wherein the controller compares induced current from each of the of loop unit and the another loop unit, and determines a loop unit having induced current with a largest magnitude to be a user-input loop unit.

17. The electromagnetic sensing apparatus of claim 16, wherein the controller determines whether a display region corresponding to a first sub-loop or a soft key corresponding to a second sub-loop in the user-input loop unit has been selected according to the magnitude of the induced current.

18. The electromagnetic sensing apparatus of claim 17, further comprising a memory for pre-storing an induced current magnitude database,     wherein if an absolute value of a difference between the magnitude of induced current from the user-input loop unit and the induced current magnitude database is smaller than a predetermined value, the controller determines that the display region corresponding to the first sub-loop of the user-input loop unit has been selected.

* * * * *